(12) United States Patent
Lee

(10) Patent No.: US 6,400,140 B1
(45) Date of Patent: Jun. 4, 2002

(54) ABSOLUTE ANGULAR SENSOR OF A STEERING SYSTEM FOR VEHICLES

(75) Inventor: Sang-Kwon Lee, Kyonggi-do (KR)

(73) Assignee: Mando Machinery Corporation, Kyonggi-do (KR)

( * ) Notice: Subject to any disclaimer, the term of this patent is extended or adjusted under 35 U.S.C. 154(b) by 0 days.

(21) Appl. No.: 09/217,749

(22) Filed: Dec. 21, 1998

(30) Foreign Application Priority Data

Dec. 30, 1997 (KR) .............................................. 97-77566

(51) Int. Cl.⁷ ............................ H03M 1/24; G01B 7/30
(52) U.S. Cl. ................. 324/207.18; 324/207.25
(58) Field of Search ................... 324/207.18, 207.13, 324/207.24, 207.25; 336/45, 79, 200; 341/15

(56) References Cited

U.S. PATENT DOCUMENTS 5,180,979 A * 1/1993 Frazzini et al. ......... 324/207.18

FOREIGN PATENT DOCUMENTS

GB          1445543     *   8/1976    ........... F16H/25/08

* cited by examiner

*Primary Examiner*—Jay Patidar
(74) *Attorney, Agent, or Firm*—Lackenbach Siegel; J. Harold Nissen

(57) ABSTRACT

An absolute angular sensor of a steering system for vehicles, which includes a power supply for supplying power, a pulse supply for generating pulses, a linear variable displacement transducer operated by a pulse outputted from the pulse generator for sensing a variable displacement of a rotator disc mounted at a steering shaft when the steering shaft operates, and outputting a signal in proportion to the sensed rotation displacement, a demodulator for demodulating the outputted signal from the linear variable displacement transducer, a DC (Direct Current) amplifier for amplifying the rectified external displacement from the demodulator into a certain level, and a DC output part for providing a signal output amplified by the DC amplifier, whereby it is possible to sense an absolute position accurately and an absolute angle of the steering shaft accurately.

2 Claims, 3 Drawing Sheets

ABSOLUTE ANGULAR SENSOR OF A STEERING SYSTEM FOR VEHICLES

BACKGROUND OF THE INVENTION

1. Field of the Invention

The present invention relates to steering and braking systems, and more particularly to, an absolute angular sensor of a steering system for vehicles.

2. Description of the Conventional Art

FIG. 1 and FIG. 2 show the construction of a prior art steering sensor and a prior art rotator disc. In FIG. 1, and FIG. 2, a conventional steering sensor usually includes a photo interrupt part composed of a photo diode 1 and a photo transistor 2, a signal processor part 3 for processing signals input from the photo interrupt part, and a rotator disc 4 having a plurality of holes 5.

In the conventional steering sensor, the rotator disc 4 rotates in the photo interrupt. If the position of the photo diode 1 coincides with that of the holes 5 during the rotator disc's rotation in the photo interrupt, light from the photo diode 1 passes through the holes 5 of the rotator disc 4 to the photo transistor 2. According to the light input to the photo transistor 2, the signal processor part 3 recognizes a signal (e.g., high level).

On the other hand, if the photo diode 1 does not coincide with the holes 5 of the rotator disc, then the light from the photo diode 1 can not pass through the holes 5 nor reach the photo transistor 2. In this case, the signal processor part 3 recognizes a signal (e.g., low level). Therefore, the degree of rotation of a steering shaft is confirmed by continuous numbers of the signals.

However, the conventional steering sensor has a disadvantage in that the steering sensor senses only relative angle and relative angular velocity, so that it is impossible to sense an absolute position of the steering shaft. According to the conventional steering sensor, it is impossible to check as to whether the steering shaft is positioned at a first turn angle or a second turn angle, since the steering shaft may turn totally 3.5 rounds, that is, 1260 angle degrees.

Therefore, it is required to develop an absolute angular sensor for sensing the absolute position of the steering shaft in a steering system.

SUMMARY OF THE INVENTION

The present invention is derived to resolve the disadvantages of the conventional techniques and it is an object of the present invention to provide an absolute angular sensor of a steering system for vehicles, in which an absolute angle of a current steering shaft position may be sensed by converting an absolute rotation displacement of the steering shaft into a linear displacement by means of a linear variable displacement transducer.

In order to achieve the above objects of the present invention, in the steering and braking systems, a rotator disc is mounted under a steering shaft so that a rotation of the rotator disc in response to rotation of the steering shaft is converted into a linear displacement by the linear variable displacement transducer, thereby sensing an absolute position and an absolute angle of the handle accurately.

BRIEF DESCRIPTION OF THE DRAWINGS

The present invention will become more fully understood from the detailed description given hereinbelow with reference to the accompanying drawings which are given by way of illustration only, and thus are not limitative of the present invention, and wherein.

DETAILED DESCRIPTION OF THE INVENTION

An absolute angular sensor of a steering system for vehicles according to a preferred embodiment of the present invention will be explained in detail with reference to the hereinbelow accompanying drawings.

Figure 1:
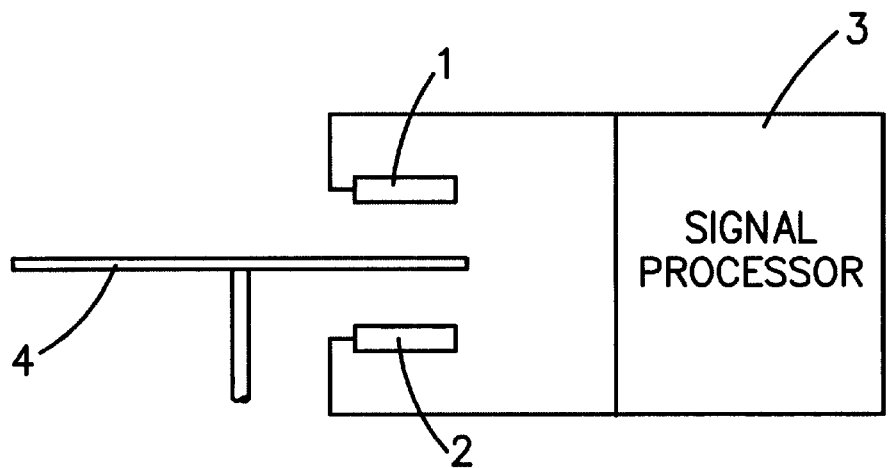
FIG. 1 shows the construction of a prior art steering sensor for sensing relative angular velocity.
Figure 2:
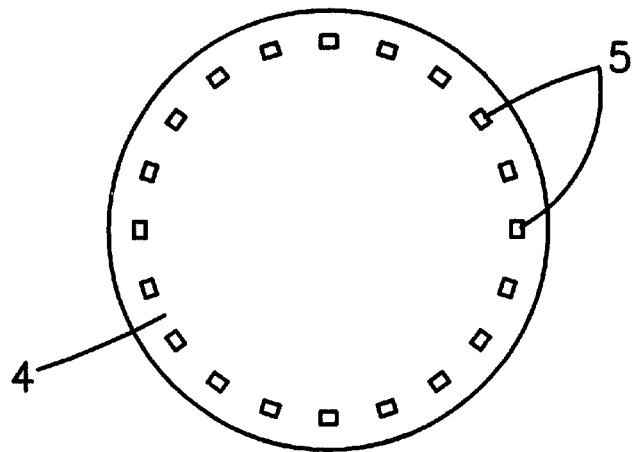
FIG. 2 is a schematic plan view showing a prior art rotator disc.
Figure 3:
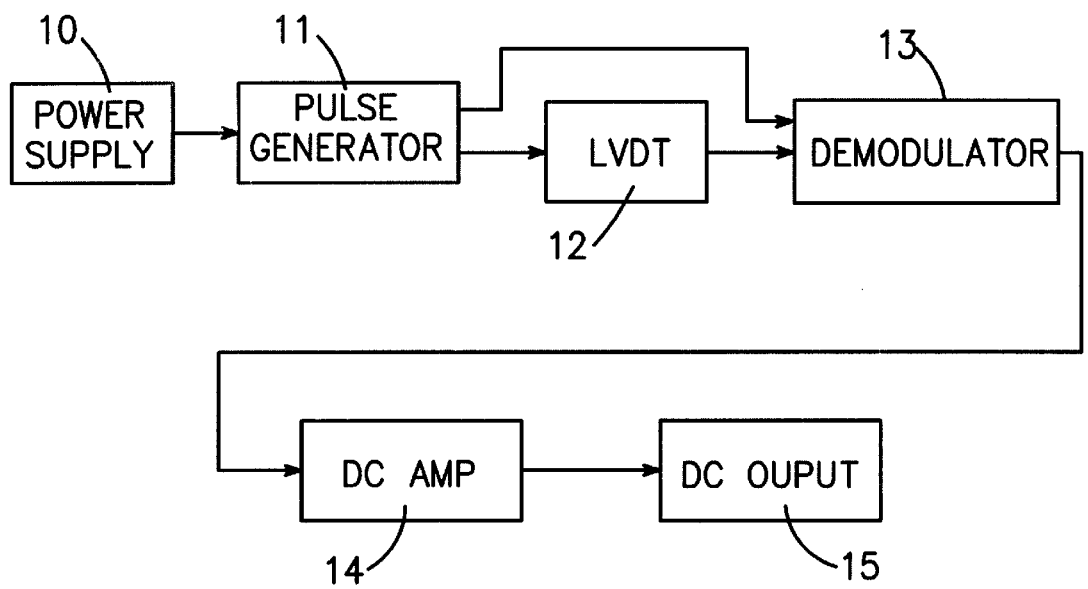
FIG. 3 is a block diagram showing an absolute angular sensor of a steering system for vehicles according to a preferred embodiment of the present invention.

FIG. 3 is a block diagram illustrating an absolute angular sensor of a steering system for vehicles according to a preferred embodiment of the present invention.

In FIG. 3, an absolute angular sensor of a steering system for vehicles includes a power supply 10 for supplying operation power, a pulse generating part or pulse supply 11 for generating operation pulse, a linear variable displacement transducer LVDT 12 which is operated by a pulse outputted from the pulse generating part 11 for sensing a linear displacement, a demodulator 13 for multiplying the linear displacement by an alternating current AC and rectifying the AC to provide an external displacement output, a direct current DC amplifier 14 for amplifying the external displacement output for amplifying from the demodulator 13 up to a predetermined level, and a direct current DC output part 15 coupled to the DC amplifier 14 for providing an output based on the amplified external displacement output.

Figure 4:
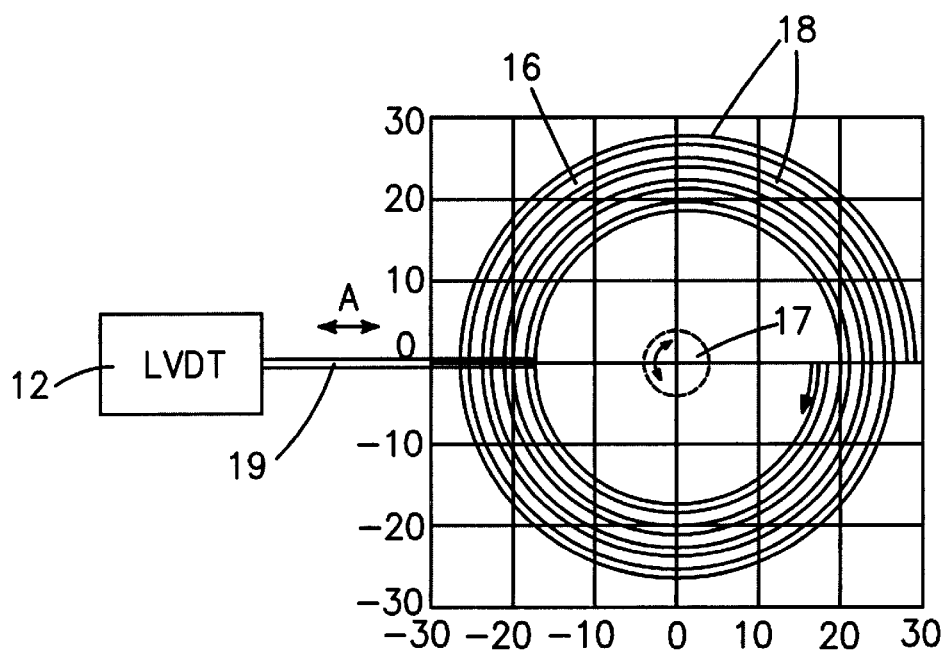
FIG. 4 shows the construction of a rotator disc according to a preferred embodiment of the present invention.

FIG. 4 shows the construction of a rotator disc 16 according to a preferred embodiment of the present invention.

In FIG. 4, the rotator disc 16 is mounted with a shaft 17 in the center thereof and connected to a bar 19 of the linear variable displacement transducer LVDT 12. The rotator disc is formed with a circular groove around the shaft 17, which is in the form of spiral and increases outwardly in its radius by a predetermined interval between pitches.

Figure 5:
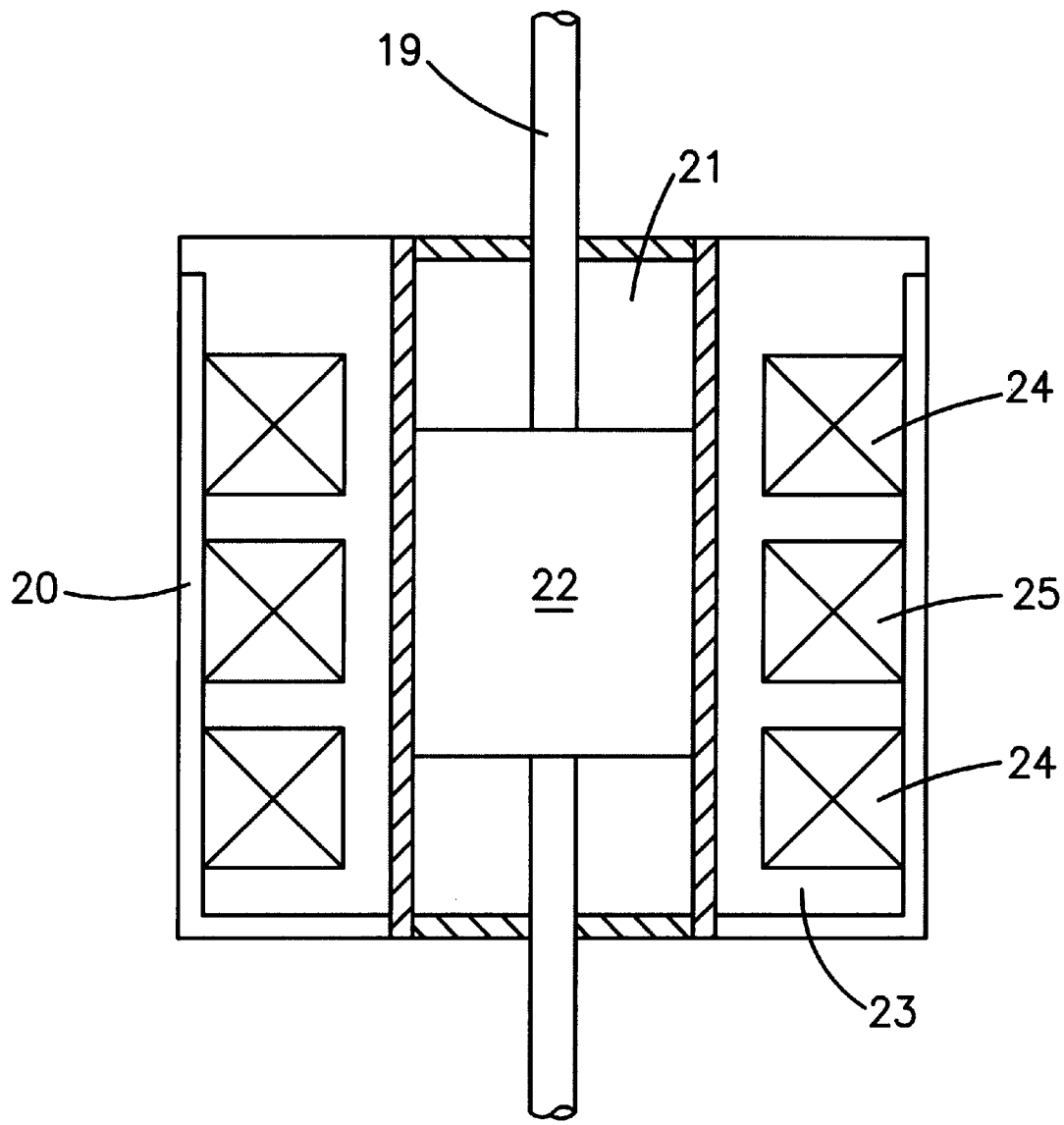
FIG. 5 is a longitudinal-sectional view showing the detailed construction of a linear variable displacement transducer according to the present invention.

FIG. 5 shows the construction of the linear variable displacement transducer LVDT 12 according to the present invention in more detail.

In FIG. 5, the linear variable displacement transducer LVDT 12 includes a core 22 which is movably mounted on a cylinder 21 at a center portion in a case 20 and formed integrally with the bar 19, and a bobbin 23 which is mounted in the case 20 adjacently to the cylinder 21. Via the bobbin 23, an operation coil 25 and sensing coils 24 are wound.

According to the present invention as described above, if a driver rotates a steering wheel, the rotator disc 16 rotates in the right and left directions. As the rotator disc 16 rotates, the bar 19 of the linear variable displacement transducer LVDT 12, which is associated to the groove 18 formed on the rotator disc 16, moves in the direction as shown by arrow A in FIG. 4. Then, the linear variable displacement transducer LVDT 12 converts the movement of the bar 19 into a linear displacement.

That is, if the bar 19 moves linearly, the core 22 which is formed integral with the bar 19, as shown in FIG. 5, moves together with the bar 19. Therefore, the operation coil 25 wound between the bobbin 23 in the case 20 becomes operating and voltages, which are applied to the sensing coils 24 by the operation of the operation coil 25, are checked and demodulated via the demodulator part 13. The demodulated voltage is amplified into a predetermined level by the DC amplifier 14 and output via the DC output part 15.

EFFECT OF THE INVENTION

As described hereinabove, according to the present invention, in the steering and braking systems, a rotator disc is mounted under a steering shaft so that rotation of the rotator disc according to rotation of the steering shaft is converted into a linear displacement in the linear variable displacement transducer LVDT, there by sensing an absolute position and an absolute angle of the steering shaft accurately.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. An absolute angular sensor of a steering system for vehicles, comprising:

a power supply for supplying power;

a pulse supply for generating pulses;

a linear variable displacement transducer, operated by a pulse outputted from the pulse supply, for sensing a variable displacement of a rotator disc mounted at a steering shaft when the steering shaft operates, and outputting a signal in proportion to the sensed rotation displacement;

a demodulator for demodulating the signal outputted from said linear variable displacement transducer by rectification to produce an external displacement output;

a DC (Direct Current) amplifier for amplifying the rectified external displacement output from the demodulator into a certain level;

a DC (Direct Current) output part for providing a signal output amplified by the DC (Direct Current) amplifier; and a sensing coil wound around a bobbin at both sides of an operation coil and being applied with voltage when the operation coil is in its operation mode.

2. The sensor of claim 1, wherein the rotator disc is constructed in such a manner that the steering shaft is installed at a center portion of the same, and a spiral circular groove is centered upon the steering shaft whereby the diameter of the centerline of the groove is regularly increased, and a bar installed in the linear variable displacement transducer is movable in the groove.

* * * * *